June 9, 1931.    L. N. BRYANT ET AL    1,809,579
VEHICLE JACK
Filed April 16, 1930    3 Sheets-Sheet 2
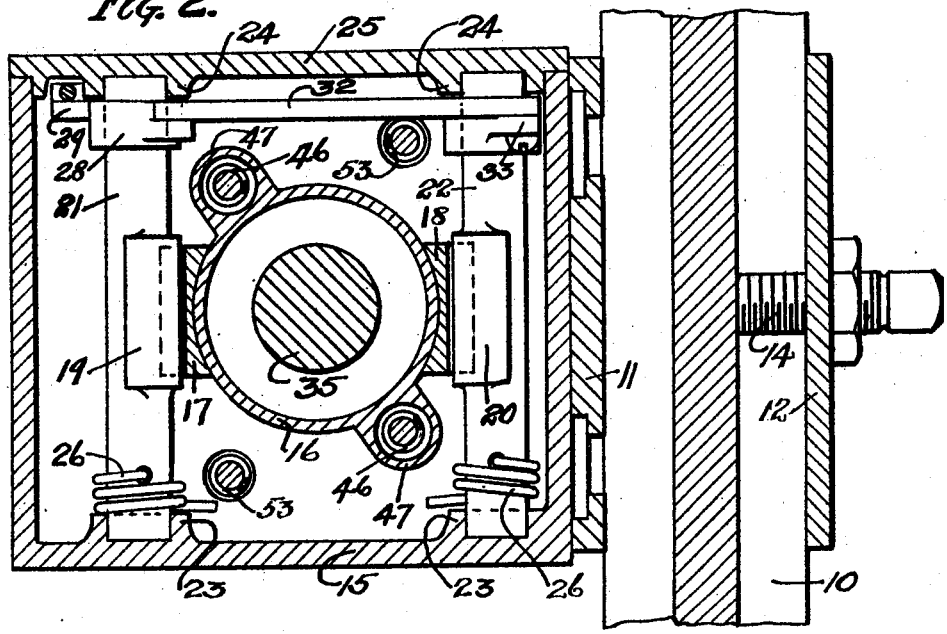
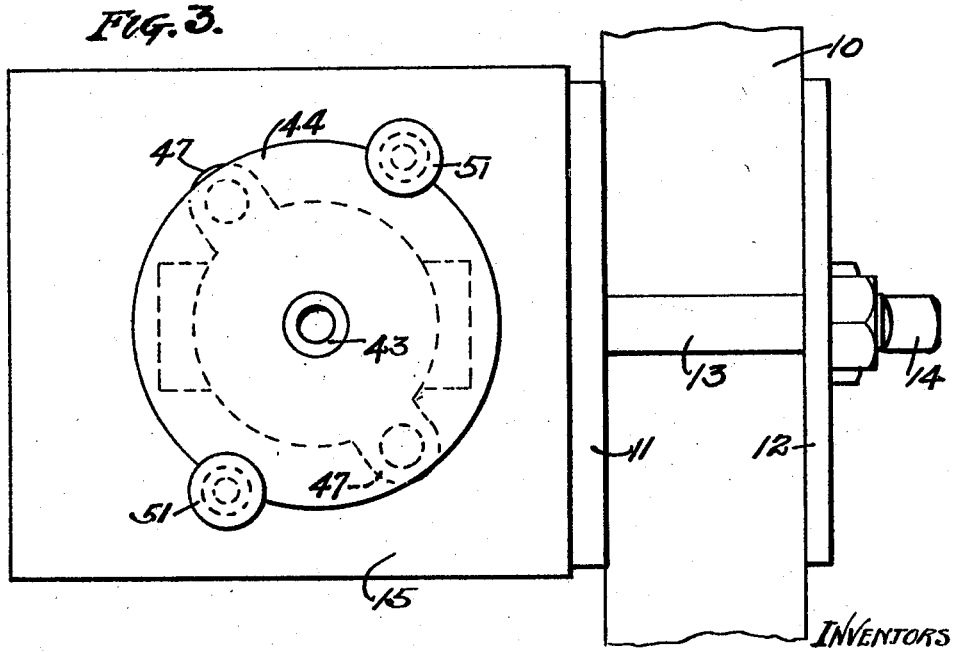
INVENTORS
LEONARD N. BRYANT
WILLIAM W. EAST JR.
MARTIN S. SWAIN
by J. R. Weatherford ATTY.

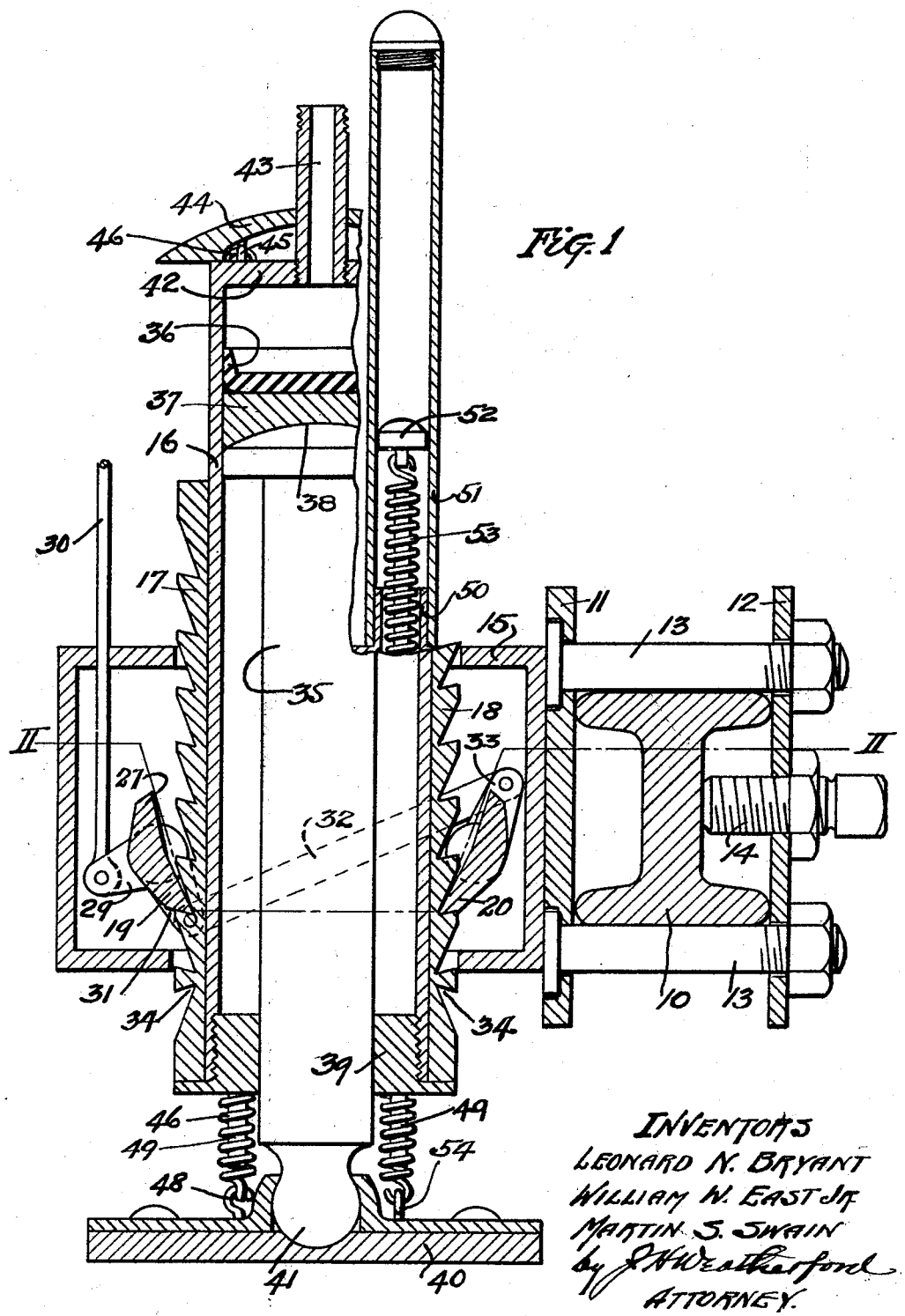

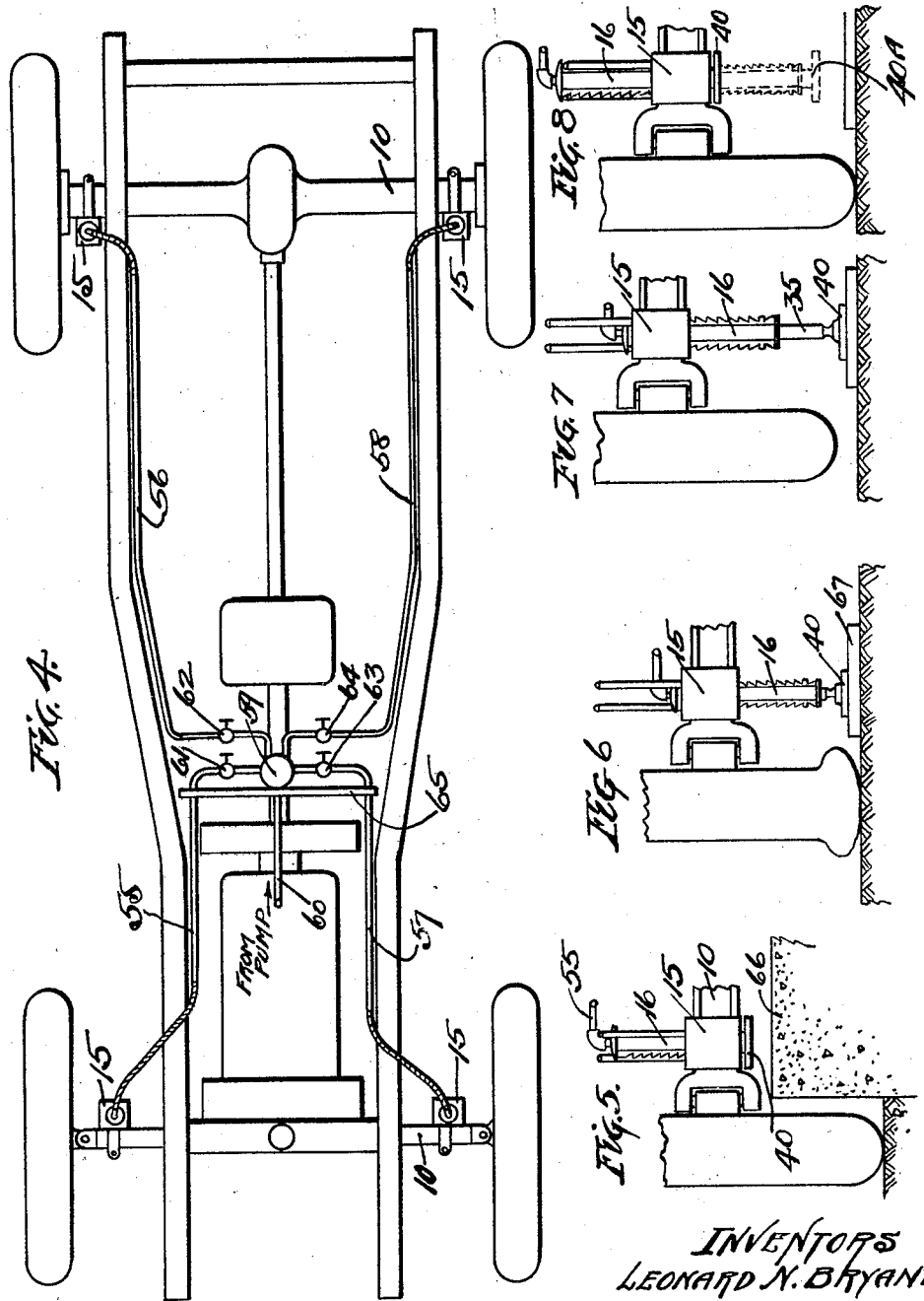

Patented June 9, 1931

1,809,579

UNITED STATES PATENT OFFICE

LEONARD N. BRYANT, OF MEMPHIS, TENNESSEE, WILLIAM W. EAST, JR., OF OXFORD, MISSISSIPPI, AND MARTIN S. SWAIN, OF CHICAGO, ILLINOIS

VEHICLE JACK

Application filed April 16, 1930. Serial No. 444,656.

This invention relates particularly to jacks designed and adapted for use in connection with automobile and other wheeled vehicles, especially those which are equipped with pneumatic tires where it is often necessary to raise the wheel to remove a tire for repairs or for other purposes. The present device is intended for permanent attachment to the part to be raised.

The objects of this invention are:

(a) To provide means for accomplishing these purposes with a minimum amount of labor and expenditure of time;

(b) To provide raising means which shall be available even though the axle of the vehicle rests directly on the ground;

(c) To provide means for quickly adjusting the vertical positioning of the jack assembly relative to the load preparatory to beginning the actual lift thereof;

(d) To provide means for restoring the jack assembly to initial position; and (e) To generally improve the design and construction of such a device.

The means by which the foregoing and other objects are accomplished and the manner of their accomplishment will readily be understood from the following specification on reference to the accompanying drawings, in which:

Fig. 1 is a sectional elevation on the center line of the jack with a portion thereof broken away to show the action of certain springs.

Fig. 2 is a sectional plan taken as on the broken line II—II of Fig. 1.

Fig. 3 is a plan view.

Fig. 4 is a diagrammatic view showing the manner of connecting the four jacks ordinarily used on an automobile with the controls therefor.

Fig. 5 is a fragmentary view showing the jack available for use with the vehicle wheel in a hole or rut.

Figs. 6, 7 and 8 are fragmentary views showing progressively various stages of the action of the device.

Referring now to the drawings, in which the various parts are indicated by numerals; 10 is the axle of an automobile, 11 and 12 are clamping plates, 13 clamping bolts and 14 a set screw all for the purpose of securing the device to the axle of the automobile. Secured to the clamping plate 11 in any usual or desired manner is a box or casing 15 through which a vertically disposed cylinder 16 is upwardly and downwardly movable. Secured to opposite sides of this cylinder are notched bars or racks 17, 18, with which racks, dogs 19, 20, respectively engage. The dog 19 is carried by and preferably integral with a transverse shaft 21 and the dog 20 is similarly mounted on a shaft 22, these shafts being journalled in oppositely disposed bearings 23, 24, formed in the walls of the casing 15. Preferably one side 25 of this casing is made removable to permit assembly of these parts. Each of the shafts is provided with a spring 26 which acts to hold the upper edges 27 of the dogs against the racks.

Mounted on and secured to the shaft 21 is a boss 28 from which an integral arm 29 extends outward. Pivotally secured to this arm and extending therefrom outside of the casing 15, preferably through the top thereof is a rod 30 which may be shifted to engage and disengage the dog with or from the rack. Also integral with the arm 28 is a second arm 31 which arm is connected by a link 32 with a corresponding arm 33 on the shaft 22, the link being pivotally connected at its ends to these arms and serving to actuate the dogs in unison.

The teeth of the racks 17 and 18 are formed to engage the lower edges of the dogs 19 and 20 respectively, except that at the lower end of each rack there is a reversely cut notch 34 which is engaged by the corresponding upper edge 27 of the dogs when the cylinder 16 is fully raised, the dogs being held in engagement with such notches by the action of the spring 26, thereby releasably retaining the cylinder in raised position. Mounted in the cylinder is a plunger 35 the upper end of which is preferably provided with a cup leather 36 forming a well known form of plunger packing. If desired the head 37 which carries this cup leather may have a ball and socket engagement 38 with the upper end of the plunger. The lower end of the plunger projects beyond the cylinder through a guide ring 39 in which it is free to slide, and which limits its outward movement. Mounted on the lower end of the plunger is a foot plate 40 which also is preferably connected by a ball and socket joint to the plunger. The upper end of the cylinder is closed by a head 42, into which head is screwed a pipe 43 through which pipe fluid may be introduced into the jack. Resting on the head 42 and preferably centered by the pipe 43 is a cover plate 44 having depending eyes 45 with which tension springs 46 may be engaged. This plate limits downward movement of the assembly relatively to the casing 15. The springs 46 extend downward through tubular casings 47, which are integral with or securely attached to the cylinder 16, and at their lower ends the springs engage eyes 48 on the foot plate 40. If desired a guide rod 49 may be loosely disposed in each of these springs. These springs 46 act at all times to hold the plunger 35 in the cylinder.

Extending upward from the top of the casing 15 are short nipples 50 around which and extending upward therefrom are tubes 51, these being on diametrically opposite sides of the cylinder and plunger. Slidably mounted in the tubes 51 are lugs or buttons 52 which are limited in their downward movement by the upper ends of the nipples 50. Secured to these buttons are springs 53 which extend down through the nipples and loosely through the casing 15 and are secured at their lower ends to eyes 54 on the foot plate 40. They too, may be provided with guide rods 49 if so desired. These springs act in addition to the springs 46 but do not come into action until the cylinder 16 has been lowered enough to bring the buttons 52 against the upper ends of the nipples 50. It will thus be seen that while the springs 46 act only to retract the piston, the springs 53 act, after their sliding movement is checked, to raise both the piston and cylinder.

Preferably four of the jack assemblies are secured by their attaching casings 15 to the axles 10 of the automobile with which they are to be used (Fig. 4). Preferably each of the cylinders is connected by an individual pipe, 55, 56, 57 or 58, with a common fluid tank 59 which tank is supplied with fluid under pressure through a suitable pipe 60. Each of the pipes is controlled by an individual valve 61, 62, 63 and 64 respectively, so that any one of the four may be individually operated. Preferably these valves are mounted on the instrument board of the automobile so that they may be accessible to the drivers' seat, they are shown diagrammatically adjacent thereto in order that they may be distinctly delineated. It will be understood however that their location, the location of the tank and the means for supplying pressure to the tank do not form a part of the present invention.

In using the device, ordinarily only one jack is used at a time, therefore in the description of the use, only one will be referred to.

In using the jack after it has been secured on the axle the cylinders 16 are pushed upward to substantially the position shown in Fig. 5, at which time the upper points of the dog 27 are engaged with the notches 34 of the rack being held in such engagement by the action of the springs 26.

Should the wheel be in position such as is shown in Fig. 5 which often occurs where the wheel runs off the edge of the present concrete highways into a rut along the edge of the concrete 66, fluid pressure may be turned into the jack through the pipe as 55, and the plunger foot 40 thereby be forced down directly against the concrete raising the axle through plunger action only. Should however the condition of a flat tire occur the rod 30 would be depressed to disengage the upper edges 27 of the dogs from the notches 34 which would permit the cylinder 16 to drop by gravity until it had reached the lower limit of its movement, substantially as shown in Fig. 6, or until the foot 40 had come to rest on the ground or suitable blocking 67 thereon. In such position the rod 30 would be forced against the spring action until the lower edges of the dogs were in engagement with the notches of the rack 17, 18 which engagement would be maintained until fluid pressure was turned on to force the plunger out of the cylinder and throw sufficient stress on the dogs to retain them. Continuing fluid flow in the cylinder would then act to raise the cylinder and axle as was desired, accomplishing substantially the position shown in Fig. 7. During such action both sets of springs 46 and 53 would be extended.

After the tire has been changed, fluid pressure in the jack is released and the wheel again allowed to rest on the ground as shown in Fig. 8. Both the cylinder and piston being then in lowered position, with the plunger however, fully retracted within the cylinder by spring action. In such case then the foot of the plunger would ordinarily occupy the dotted position 40—A somewhat above the surface of the ground. It would be held in such position directly by the action of the springs 53 the upper ends of which are supported by the nipples 50. If fluid pressure is again introduced in the jack with the dogs released the plunger would be supported by the springs 53 and the cylinder would be forced upward away from the plunger by such fluid action until the upper edges of the dogs engage the lower notches 34 of the racks and are supported thereby. Fluid pressure may then be released allowing both sets of springs to initially raise the plunger and the one set 46 to complete its upward movement.

It will thus be seen that the positioning vertically of the jack assembly prior to raising action, and the restoration of the assembly to initial position are mechanically accomplished by control of the releasing mechanisms and of the fluid pressure.

It will be understood that either gas or liquid may be used and the term fluid is intended as covering both.

Having described our invention, what we claim is:

1. In a vehicle jack, a casing and means for attaching same to a part to be raised, a cylinder mounted and vertically slidable, in said casing, a plunger within said cylinder, releasable means for retaining said cylinder in raised position relative to said casing, means for releasing same to allow said cylinder and plunger assembly to descend, releasable means for holding said cylinder in lowered position, and means for introducing fluid pressure into said cylinder to actuate said plunger.

2. In a vehicle jack, a casing and means for attaching same to a part to be raised, a cylinder mounted and vertically slidable, in said casing, a plunger within said cylinder, means for yieldably holding said plunger in said cylinder, releasable means for retaining said cylinder in raised position relative to said casing, means for releasing same to allow said cylinder and plunger assembly to descend, releasable means for holding said cylinder in lowered position, and means for introducing fluid pressure into said cylinder to actuate said plunger.

3. In a vehicle jack, a casing and means for attaching same to a part to be raised, a cylinder mounted and vertically slidable, in said casing, a plunger within said cylinder, releasable means for retaining said cylinder in raised position relative to said casing, means for releasing same to allow said cylinder and plunger assembly to descend, slidably disposed means for yieldably restraining the descent of said assembly, means for limiting the sliding motion to bring said restraining means into action, releasable means for holding said cylinder in lowered position, and means for introducing fluid pressure into said cylinder to actuate said plunger.

4. In a vehicle jack, a casing and means for attaching same to a part to be raised, a cylinder mounted, and vertically slidable, in said casing, a plunger within said cylinder, means for yieldably holding said plunger in said cylinder, releasable means for retaining said cylinder in raised position relative to said casing, means for releasing same to allow said cylinder and plunger assembly to descend, slidably disposed means for yieldably restraining the descent of said assembly, means for limiting the sliding motion to bring said restraining means into action, releasable means for holding said cylinder in lowered position, and means for introducing fluid pressure into said cylinder to actuate said plunger.

5. In a vehicle jack, a casing and means for attaching same to a part to be raised, a cylinder mounted and vertically slidable, in said casing, means for limiting the descent of said cylinder, a plunger within said cylinder, means for yieldably holding said plunger in said cylinder, releasable means for retaining said cylinder in raised position relative to said casing, means for releasing same to allow said cylinder and plunger assembly to descend, slidably disposed means for yieldably restraining the descent of said assembly, means for limiting the sliding motion to bring said restraining means into action, releasable means for holding said cylinder in lowered position, and means for introducing fluid pressure into said cylinder to actuate said plunger.

6. In a vehicle jack, a casing and means for attaching same to a part to be raised, a cylinder mounted and vertically slidable in said casing, means for limiting the movement of said cylinder, releasable means for retaining said cylinder in raised position relative to said casing, and releasable means for retaining said cylinder in lowered position; a fluid actuatable plunger in said cylinder, a foot on said plunger, means for supplying fluid pressure to said plunger to force same downward relative to said cylinder, springs secured to said cylinder and to said plunger foot, opposing downward movement of said plunger, springs secured to said plunger foot, longitudinally slidable with respect to said casing and means for limiting sliding movement of said second named springs at a predetermined point of downward movement of said assembly, whereby said latter springs will come into action as said cylinder reaches the downward limit of movement and thereafter be available to support said plunger for raising said cylinder by fluid pressure to initial position.

7. In a vehicle jack, a casing and means for attaching same to a part to be raised, a cylinder mounted and vertically slidable in said casing, releasable means for retaining said cylinder in raised position relative to said casing, and releasable means for retaining said cylinder in lowered position; a plunger in said cylinder, a foot on said plunger, means for forcing said plunger downward relative to said cylinder, springs secured to said cylinder and to said plunger foot, opposing downward movement of said plunger, springs secured to said plunger foot, longitudinally slidable with respect to said casing and means for limiting sliding movement of said second named springs at a predetermined point of downward movement of said assembly, whereby said latter springs will come into action as said cylinder reaches a predetermined point in its downward movement, and thereafter be available to support said plunger for raising said cylinder by fluid pressure to initial position.

8. In a vehicle jack, a casing and means for attaching same to a part to be raised, a cylinder mounted and vertically slidable in said casing and releasable means for retaining said cylinder in lowered position; a plunger in said cylinder, means for actuating said plunger, springs secured to said plunger longitudinally slidable with respect to said casing and means for limiting sliding movement of said springs at a predetermined point of downward movement of said cylinder, whereby said springs will come into action as said cylinder reaches said predetermined point and thereafter be available to support said plunger for raising said cylinder to initial position.

9. In a vehicle jack, a casing and means for attaching same to a part to be raised, a cylinder mounted and vertically slidable in said casing, a plunger in said cylinder, means for actuating said plunger to force same downward relative to said cylinder, springs secured to said plunger slidably movable with respect to said casing and means for limiting sliding movement of said springs at a predetermined point, whereby said springs will come into action as said cylinder reaches said predetermined point and thereafter be available to support said plunger for raising said cylinder to initial position.

10. In a vehicle jack, a casing and means for attaching same to a part to be raised, a cylinder mounted and vertically slidable in said casing, a plunger in said cylinder, means for actuating said plunger to force same downward relative to said cylinder, retracting means secured to said plunger slidably movable with respect to said casing and means for limiting sliding movement of said retracting means at a predetermined point whereby said means will come into action as said cylinder reaches said predetermined point and thereafter be available to support said plunger for raising said cylinder to initial position.

In testimony whereof we hereunto affix our signatures.

LEONARD N. BRYANT.
WILLIAM W. EAST, Jr.
MARTIN S. SWAIN.